(12) United States Patent
Dimeo et al.

(10) Patent No.: US 7,181,184 B1
(45) Date of Patent: Feb. 20, 2007

(54) BAND EDGE AMPLITUDE REDUCTION SYSTEM AND METHOD

(75) Inventors: Richard W Dimeo, Randolph, NJ (US); Arild Kolsrud, Bridgewater, NJ (US); Sanjay Kumar, Parsippany, NJ (US); Carmine James Pagano, II, Blairstown, NY (US)

(73) Assignee: Lucent Technologies Inc., Murray Hill, NJ (US)

( * ) Notice: Subject to any disclaimer, the term of this patent is extended or adjusted under 35 U.S.C. 154(b) by 485 days.

(21) Appl. No.: 09/643,647

(22) Filed: Aug. 22, 2000

(51) Int. Cl.
*H04B 1/10* (2006.01)

(52) U.S. Cl. .................. 455/296; 455/227; 455/266; 455/283; 455/286; 455/303; 455/306; 455/339; 455/180.1; 455/188.1; 375/346; 375/349; 375/350

(58) Field of Classification Search .............. 455/266, 455/254, 227, 296, 307, 303, 305, 306, 283, 455/286, 339, 338, 179.1, 180.1, 188.1, 340, 455/191.1, 191.3, 63.1; 375/346, 349, 350
See application file for complete search history.

(56) References Cited

U.S. PATENT DOCUMENTS

| 5,097,221 A | | 3/1992 | Miller ........................ 329/318 |
| 5,303,413 A | * | 4/1994 | Braegas ...................... 455/266 |
| 5,307,515 A | * | 4/1994 | Kuo et al. ................... 455/307 |
| 5,317,289 A | * | 5/1994 | Konishi et al. .............. 455/307 |
| 5,339,455 A | * | 8/1994 | Vogt et al. ................... 455/307 |
| 5,493,717 A | * | 2/1996 | Schwarz ...................... 455/307 |
| 5,603,110 A | | 2/1997 | Heinzmann ................. 455/203 |
| 5,758,296 A | * | 5/1998 | Nakamura .................. 455/307 |
| 6,178,211 B1 | * | 1/2001 | Whikehart et al. ......... 455/296 |
| 6,178,314 B1 | * | 1/2001 | Whikehart et al. ...... 455/188.1 |
| 6,501,944 B1 | * | 12/2002 | Szydlowski et al. ........ 455/266 |

FOREIGN PATENT DOCUMENTS

| EP | 0410663 | 1/1991 |
| EP | 0715417 | 6/1996 |
| JP | 2000-78039 | * 3/2000 |

* cited by examiner

*Primary Examiner*—Steve M. D'Agosta

(57) ABSTRACT

A band edge amplitude reduction system changes the filtering characteristics of a receiver based on the amplitude of signal(s) adjacent to an edge of the operating band of the receiver and/or of signals not under the power control of the receiver. For example, the receiver measures the power level over a bandwidth at the band edges of the operating band of the receiver. If the signals adjacent to the operating band are strong enough relative to the signal power within the operating band, overload protection circuitry changes the filtering characteristics of the receiver to improve the attenuation of the signal(s) from the adjacent band(s). In certain embodiments, the overload protection circuitry switches in filter(s) with a narrower bandwidth to attenuate the signal(s) from adjacent band(s) at the edge(s) of the operating band of the receiver, thereby preventing interference with or the overload of the receiver by signals from outside the operating band and/or not under the power control of the receiver.

4 Claims, 2 Drawing Sheets

BAND EDGE AMPLITUDE REDUCTION SYSTEM AND METHOD

BACKGROUND OF THE INVENTION

1. Field of the Invention

This invention relates to a wireless communications and, more particularly, to a band edge power cancellation scheme to reduce interference in a wireless communications system.

2. Description of Related Art

The service area of a wireless communication system is partitioned into connected service domains known as cells, where wireless units communicate via radio links with a base station (BS) serving the cell. The base station is coupled to a land network, for example through a Mobile Switching Center (MSC) which is connected to a plurality of base stations dispersed throughout the service area. In the wireless communications industry, a service provider is often granted two or more non-contiguous or segregated frequency bands to be used for the wireless transmission and reception of RF communications channels. For example, in the United States, a base station for an "A" band provider for cellular communications receives frequency channels within the A (825–835 MHz), A' (845–846.5 MHz) and A" (824–825 MHz) bands, and the wireless units receive frequency channels within the A (870–880 MHz), A' (890–891.5 MHz) and A" (869–870 MHz) bands. A base station for a B band provider receives frequency channels within the B (835–845 MHz) and B'(846.5–849 MHz) frequency bands, and the wireless units receive frequency channels within the B (880–890 MHz) and B'(891.5–894 MHz) frequency bands. Additionally, a base station for a Personal Communications Systems (PCS) provider may receive frequency channels from wireless units on one or more PCS bands (1850 MHz–1910 MHz), and the wireless units receive frequency channels on one or more PCS bands (1930–1990 MHz).

To improve system performance and increase system capacity, the power levels transmitted by the wireless units and/or the base stations are controlled. Power control is generally done by the receiving unit or station measuring the signal strength from the transmitting station or unit. The receiving unit or station can adjust its transmit power based on the received signal strength, and/or the receiving unit or station can relay power control information to the transmitting unit which adjusts its transmit power level in response to the power control information. The power level transmitted by every wireless unit is typically under the control of the serving base station, and the base station performs power control to reduce the power level that each wireless unit is transmitting while maintaining a good quality reverse link. By decreasing the power level that each wireless unit is transmitting, system-wide interference created by the transmissions of the wireless units is reduced. Such a scenario allows increased capacity for the wireless cellular communications system because as the transmit powers are decreased, the overall signal to interference ratio decreases for all wireless units in the wireless cellular communications system.

Since frequency bands of adjacent cells and/or adjacent wireless communications systems are not under the power control of the same base station, there is a possibility that one or more signals/carriers from another cell that are close to the operating frequency band of a base station might be too strong in power and overload the radio receiver circuitry in the base station. For example, in order to reduce system hardware costs, a service provider would want to use common receivers for the simultaneous reception and processing of signals within the non-contiguous frequency bands. Typically, an automatic gain control (AGC) at the front-end of the receiver is effective in protecting the base station from overload but at the expense of any users at the fringe of the cell.

However, due to the finite roll-off characteristics of filters in the radio receiver, a signal from an adjacent band may come through the radio receiver at a power level strong enough to saturate the wideband analog to digital (A/D) converter. The A/D converter is the most critical component to protect against overload in a modern cellular radio receiver. The A/D converter does not operate in a soft clipping manner as is the case with amplifiers, mixers and other analog semiconductor devices. Once the A/D converter is saturated (i.e., input signal is above the full scale resolution of the A/D), the digital output code cannot go above the maximum binary number limited by the resolution in bits. The sudden change (or sudden stop/clipping) in binary output pattern from the A/D converter, which digitizes and tracks the analog input signal, is called a discontinuity and results in a massive spurious response in the digital domain (when a Fourier transform is taken of the supposed analog input signal with a sudden clipping of the amplitude).

It is necessary to implement some overload protection in order to prevent saturation of the A/D converter.

SUMMARY OF THE INVENTION

The present invention is a band edge amplitude reduction system which changes the filtering characteristics of a receiver based on the amplitude of signal(s) adjacent to an edge of the operating band of the receiver and/or of signals not under the power control of the receiver. For example, the receiver measures the power level over a bandwidth at the band edges of the operating band of the receiver. If the signals adjacent to the operating band are strong enough relative to the signal power within the operating band, overload protection circuitry changes the filtering characteristics of the receiver to improve the attenuation of the signal(s) from the adjacent band(s). In certain embodiments, the overload protection circuitry switches in filter(s) with a narrower bandwidth to attenuate the signal(s) from adjacent band(s) at the edge(s) of the operating band of the receiver, thereby preventing interference with or the overload of the receiver by signals from outside the operating band and/or not under the power control of the receiver.

BRIEF DESCRIPTION OF THE DRAWINGS

Other aspects and advantages of the present invention may become apparent upon reading the following detailed description and upon reference to the drawings in which.

DETAILED DESCRIPTION

Figure 1:
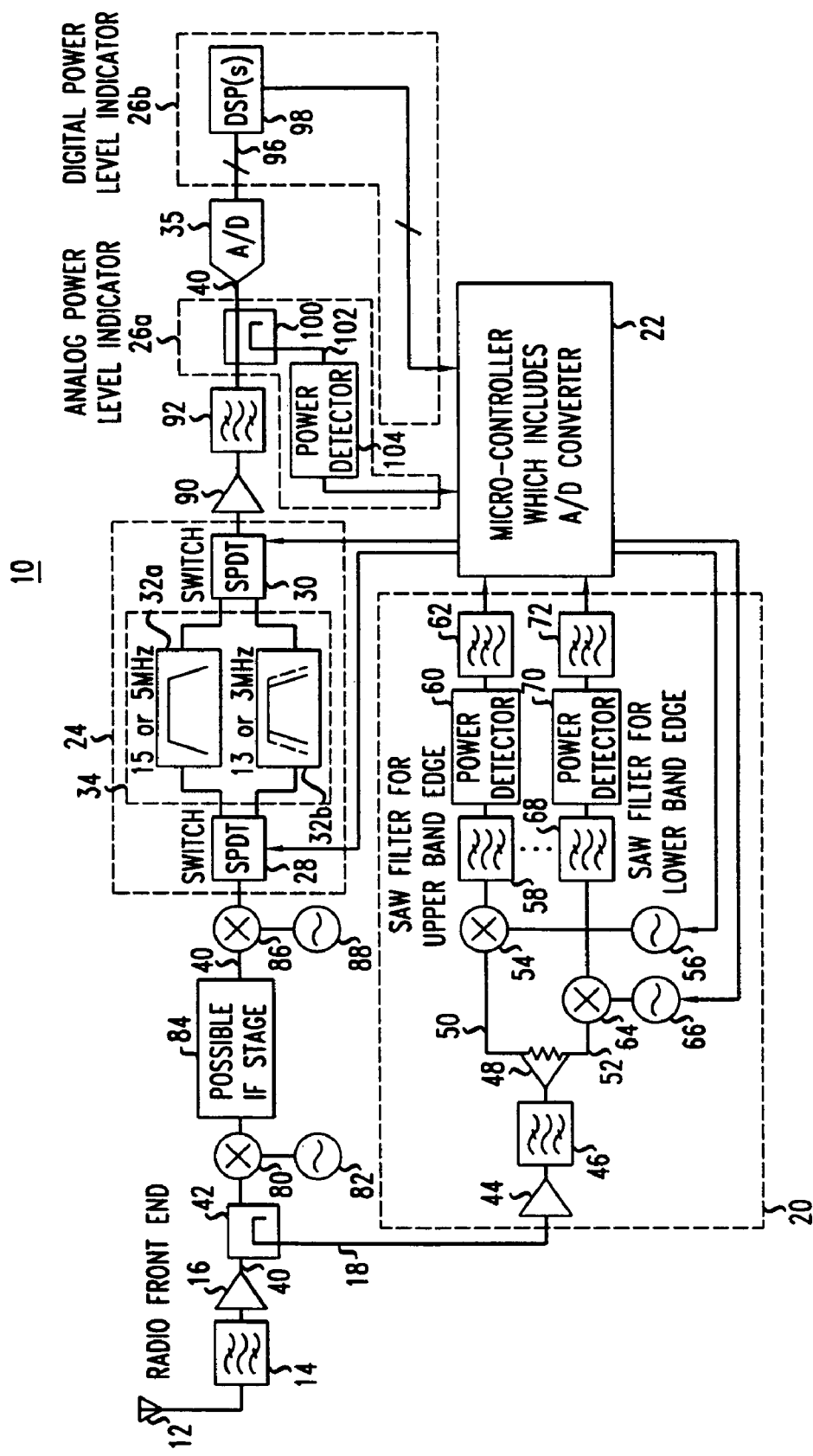
FIG. 1 shows a general block diagram of a receiver using the band edge amplitude reduction circuitry according to the principles of the present invention.

Illustrative embodiments of a receiver system using the band edge power reduction circuitry according to the principles of the present invention is described below. With particular reference to FIG. 1, a receiver 10 includes an antenna(s) 12 which receives radio frequency (RF) analog signals which are filtered by a RF bandpass filter 14 to produce an operating frequency band for the receiver 10. The output of the RF filter 14 is provided to an amplifier 16, such as a low noise amplifier for amplification. The radio front-end is comprised of at least the antenna 12, the RF filter 14 and the amplifier 16. A replica of the operating frequency band is provided to a band edge detection path 18 for detection by band edge power detector circuitry 20. The band edge power detection circuitry 20 measures at least one amplitude, such as power level, for a bandwidth(s) adjacent to or at the edge(s) relative to the operating frequency band and/or from signals not under the control of the receiver 10. For example the power level(s) of a narrow band(s) of frequencies adjacent to or at the edge of the frequency band of operation, such as a narrow band from 30 KHz to 1 MHz wide using a SAW, lumped-element or other type of filter. As a function of the rogue, unwanted or interfering amplitude(s), processing circuitry 22 provides control signals to change the filtering characteristics of a variable filter 24 to attenuate the amplitude, for example the interference, at the band edge(s) of the frequency band of operation. Band edge can refer to a bandwidth that is adjacent to and/or encompasses an edge of the frequency band of operation.

Depending on the embodiment, the processing circuitry 22 can make a comparison between the amplitude(s) at the band edge(s) and an amplitude, such as a power level, provided by an analog amplitude indicator 26a or a digital amplitude indicator 26b for the frequency band of operation or a portion thereof. Based on the comparison, the processing circuitry 22 can provide control signals to the variable filter 24 to change the filtering characteristics of the variable filter 24. For example, the control signals control switches 28 and 30 which switch the received signals between filters 32a–b in a filter bank 34. As a function of the amplitude(s) at band edge(s) adjacent to the frequency band of operation, the processing circuitry 22 can cause the switching between filters 32a–b to narrow the band (for example, from 15 to 13 MHz or from 5 MHz to 3 MHz) passed through the variable filter 24 at either or both band edges to attenuate the amplitude, such as power level or interference at the band edge(s), such as power from adjacent frequency bands from wireless units (not shown) and/or not under the power control of the receiver 10.

In alternative embodiments, the processing circuitry 22, such as a micro-controller and A/D converter, can provide control signal(s) to control the variable filter 24 as a function of the amplitude of signals not under the control of the receiver 10, for example by comparing the amplitude of signals under the control of the receiver 10 and the total amplitude of signals within the frequency band of operation. Alternatively, the amplitude of signals not under the control of the receiver 10 can be assumed and cause a change in the filtering characteristics of the receiver 10 if the processing circuitry 22 receives an indication of overload or saturation, for example by receiving an overload signal from the A/D 35. Furthermore, alternative embodiments for the variable filter 24 are possible for which the filtering characteristics can change using control signal(s) from the processing circuitry 22. For example, a programmable filter, a programmable array of filter elements, a varactor-tuned filter and/or a tunable cavity filter could be used.

In the embodiment shown in FIG. 1, RF analog signals are received by the antenna 12 and the radio front end onto a main signal path 40. A coupler 42 provides a replica of the RF analog signals on the main signal path 40 directly from the radio front end at radio frequency (RF) onto the band edge detection path 18 for the band edge detection circuitry 20. The band edge detection circuitry 20 receives the RF spectrum from the band edge detection path 18, and an amplifier 44 amplifies the RF analog signals on the path 18. The RF analog signals are then filtered in a desired manner by a bandpass filter 46, for example to include frequencies adjacent to the frequency band of operation. A splitter 48 divides the RF analog signals on the band edge detection path 18 and provides a replica of the RF spectrum on an upper edge detection path 50 and a lower edge detection path 52. On the upper edge detection path 50, a mixer 54 mixes the RF analog signals with a signal from a local oscillator (LO) 56 to frequency convert the RF spectrum, for example to a lower frequency, for improved filtering and detection. The analog spectrum from the mixer 54 is provided to a bandpass filter 58 which passes an upper band edge bandwidth of frequencies from the upper band edge relative to the frequency band of operation and attenuates other frequencies, for example a surface acoustic wave (SAW) filter. The upper band edge bandwidth is provided to a power detector 60 which produces a signal indicating or representing the power level of the upper band edge bandwidth. A low pass filter 62 filters the signal from the power detector 60 to produce for the processing circuitry 22 a slower changing amplitude signal which represents the power level of the upper edge bandwidth.

On the lower edge detection path 52, a mixer 64 mixes the RF analog signals with a signal from a local oscillator (LO) 66 to frequency convert the RF spectrum, for example to a lower frequency, for improved filtering and detection. The analog spectrum from the mixer 64 is provided to a bandpass filter 68, such as a SAW filter, which passes a lower band edge bandwidth of frequencies relative to the frequency band of operation and attenuates other frequencies. The lower band edge bandwidth is provided to a power detector 70 which produces a signal indicating or representing the power level of the lower band edge bandwidth. A low pass filter 72 filters the signal from the power detector 70 to produce for the processing circuitry 22 a slower changing amplitude signal which represents the power level of the lower edge bandwidth. Thus, in this embodiment, the processing circuitry 22 receives signals indicating or representing the power levels of the upper and lower band edge bandwidths. Depending on the embodiment, additional band edge detection paths can be used to detect additional band edges if the receiver 10 operates within a changing frequency band of operation or operates within a fragmented or non-contiguous frequency band of operation between different cells and/or wireless communications systems. Additionally, depending on the frequency band of operation, the processing circuitry 22 can provide control signal to the LOs 56 and 66 to tune the LOs to different frequencies such that the band edge bandwidth can be changed.

On the main signal path 40 after the coupler 42, the RF analog signals are downconverted to an intermediate frequency (IF) by providing the spectrum to a mixer 80 which also receives a signal from a local oscillator (LO) 82. After passing through any additional IF stage 84, the spectrum of interest is further downconverted by providing the spectrum to a mixer 86 which also receives a signal from a local oscillator (LO) 88. The spectrum is then provided to the variable filter 34 which filters the spectrum as a function of the amplitude(s) at the band edge(s) adjacent to the frequency band of operation. The filtered signal is amplified by an amplifier 90, and in this embodiment, a bandpass filter 92 further filters the spectrum. In this embodiment, the analog spectrum is provided to the analog to digital (A/D) converter 35 for conversion into the digital domain. The analog signals are sampled and digital sample values are produced (from which a digital representation of the analog spectrum can be obtained) onto a bus 96 to processing circuitry 98 which can include digital downconverters (DDCs) and digital signal processors (DSPs) (as well as the processing circuitry 22). If the power level at the band-edge(s) relative to the frequency band of operation for the receiver 10 is above a certain level, for example from RF signal sources operating in adjacent frequencies and/or not under the control of the receiver 10, the power level at the band edges could saturate the A/D converter 35.

Depending on the embodiment, the processing circuitry 22 can provide control signals to the variable or tunable filter 34 as a function of the amplitude(s) at the band edge(s), of adjacent frequencies and/or of signals not under the control of the receiver 10 to attenuate the amplitude, such as the power, at the band edge(s). In addition to the power at the band edge(s), the processing circuitry 22 can change the filtering characteristics as a function of the amplitude, such as power level, of the frequency band of operation or a portion thereof. For example, the processing circuitry 22 can provide control signals to the variable filter 34 based on a comparison of the power level of band edge(s) and a power level of the frequency band of operation or a portion thereof. Depending on the embodiment, the analog power indicator 26a can include a coupler 100 which provides a replica of the frequency band of operation onto a analog power detection path 102 to a power detector 104. The power detector 104 provides a signal to the processing circuitry 22 which indicates or represents a power level for the frequency band of operation. Alternatively, the digital power level indicator 26b can include a portion of the processing circuitry 98 which provides a signal or value representing the power level of the frequency band of operation or a portion thereof to the processing circuitry 22 (which could be part of the processing circuitry 98). Thus, the band edge power reduction system can prevent the overload of the A/D converter 35 interference within the operating bandwidth caused by signals from wireless units or RF signal sources operating in adjacent bands and/or not under the power control of the receiver 10.

Figure 2:
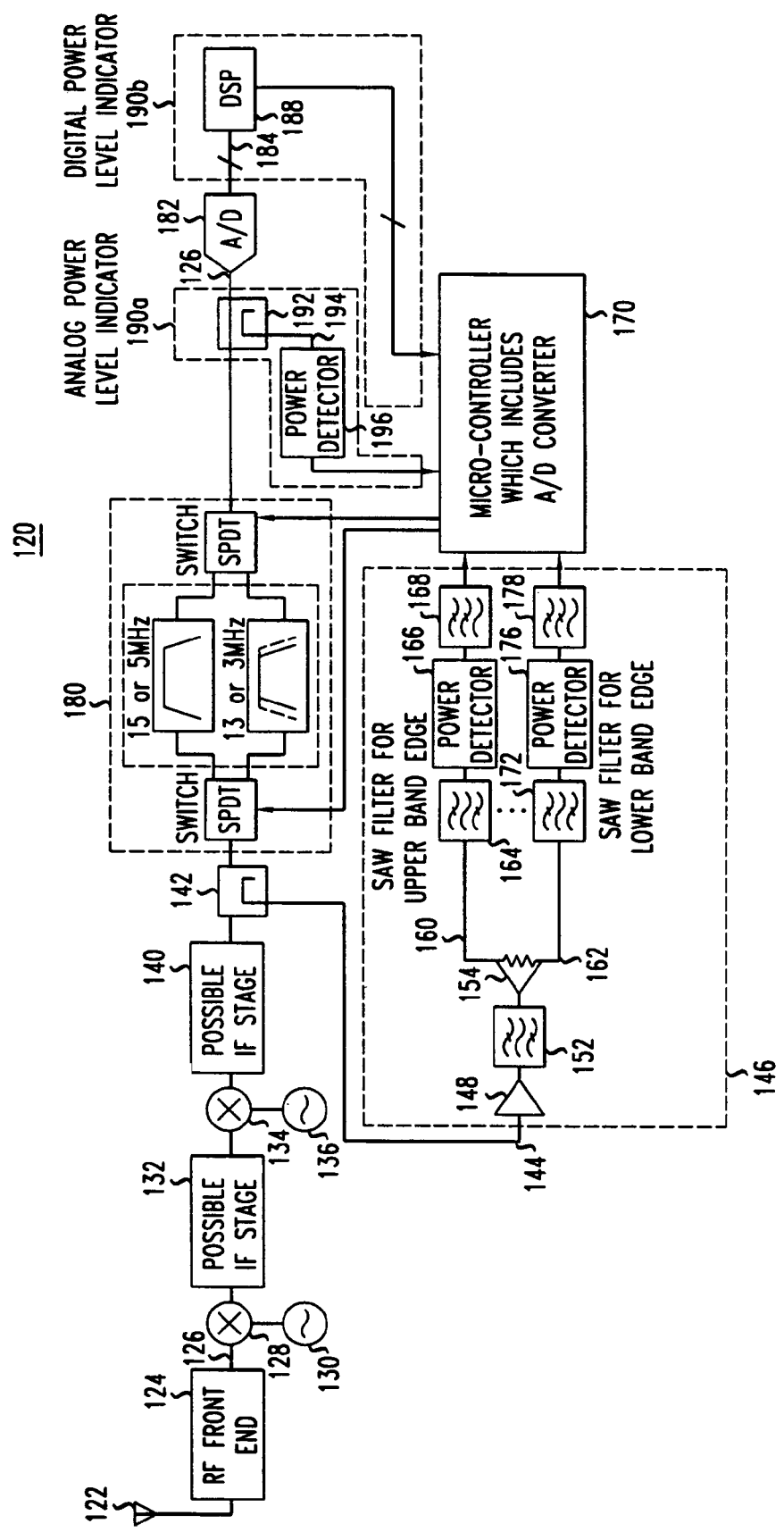
FIG. 2 shows a block diagram of an alternative embodiment of a receiver using the band edge amplitude reduction circuitry according to the principles of the present invention.

FIG. 2 shows an alternative embodiment of a receiver 120 which uses an embodiment of the band edge reduction system which searches for overloading band edge signals after the last intermediate (IF) frequency stage. The receiver 120 receives radio frequency (RF) analog signals at the antenna 122 and the radio front end 124 onto a main signal path 126. The RF analog signals are down-converted to an intermediate frequency (IF) by providing the RF analog signals to a mixer 128 which also receives a signal from a local oscillator (LO) 130. After passing through a possible IF stage 132, the spectrum of interest is further down-converted by providing the spectrum to a mixer 134 which also receives a signal from a local oscillator (LO) 136. After passing through a possible additional IF stage 140, a coupler 142 provides a replica of the analog signal spectrum on the main signal path 126 onto a band edge detection path 144 for band edge detection circuitry 146.

The band edge detection circuitry 146 receives the analog spectrum from the band edge detection path 144, and an amplifier 148 amplifies the analog signals on the path 144. The analog signals are then filtered in a desired manner by a bandpass filter 152. A splitter 154 divides the analog signals on the band edge detection path 144 and provides a replica of the spectrum on an upper edge detection path 160 and a lower edge detection path 162. On the upper edge detection path 160, the analog spectrum is provided to a bandpass filter 164, such as a SAW filter, which passes an upper band edge bandwidth of frequencies from the upper band edge relative to the frequency band of operation and attenuates other frequencies. The upper band edge bandwidth is provided to a power detector 166 which produces a signal indicating or representing the power level of the upper band edge bandwidth. A low pass filter 168 filters the signal from the power detector 166 to produce for processing circuitry 170, such as a micro-controller including an A/D converter, a slower changing amplitude signal which represents the power level of the upper edge bandwidth.

On the lower edge detection path 162, the analog spectrum is provided to a bandpass filter 172, such as a SAW filter, which passes a lower band edge bandwidth of frequencies from the lower band edge relative to the frequency band of operation and attenuates other frequencies. The lower band edge bandwidth is provided to a power detector 176 which produces a signal indicating or representing the power level of the lower band edge bandwidth. A low pass filter 178 filters the signal from the power detector 176 to produce for the processing circuitry 170 a slower changing amplitude signal which represents the power level of the lower edge bandwidth. Thus, in this embodiment, the processing circuitry 170 receives signals indicating or representing the power levels of the upper and lower band edge bandwidths, and as a function of the amplitude at the band edge(s), the processing circuitry provides control signals to change the filtering characteristics of a variable filter 180, for example to attenuate the power at the band edge(s). Depending on the embodiment, additional band edge detection paths can be used to detect additional band edges, for example if the receiver 120 operates within a changing frequency band of operation or operates within a fragmented or non-contiguous frequency band of operation between different cells and/or wireless communications systems.

On the main signal path 126 at the output to the coupler 142, the spectrum is then provided to the variable filter 180 which filters the spectrum as a function of the amplitude(s) at the band edge(s), adjacent frequency band(s) and/or of signals not under the control of the receiver 120. In this embodiment, the analog spectrum is provided to an analog to digital (A/D) converter 182 for conversion into the digital domain. The analog signals are sampled and digital sample values are produced (from which a digital representation of the analog spectrum can be obtained) onto a bus 184 to processing circuitry 188 which can include digital downconverters (DDCs) and digital signal processors (DSPs) (as well as the processing circuitry 170). If the power level(s) at the band-edge(s) adjacent to the frequency band of operation for the receiver 120 is above a certain level, for example from a wireless unit operating in adjacent frequencies, the power level at the band edge(s) could saturate the A/D converter 182.

The processing circuitry 170 can provide control signals to the variable filter 180 as a function of the amplitude(s) at the band edge(s), at adjacent frequencies and/or of signals not under the control of the receiver 120 to attenuate the power at the band edge(s). In addition to the power at the band edge(s), at adjacent frequencies and/or of signals not under the control of the receiver 120, the processing circuitry 120 can change the filtering characteristics as a function of the amplitude, such as power level, of the frequency band of operation or a portion thereof. For example, the processing circuitry 170 can provide control signals to the variable filter 180 based on a comparison of the power level of band edge(s) and a power level of the frequency band of operation or a portion thereof. Depending on the embodiment, an analog power indicator 190a can include a coupler 192 which provides a replica of the frequency band of operation onto a analog power detection path 194 to a power detector 196. The power detector 196 provides a signal to the processing circuitry 170 which indicates or represents a power level for the spectrum of operation. Alternatively, the digital power level indicator 190b can include a portion of the processing circuitry 188 which provides a signal or value representing the power level of the frequency band of operation or a portion thereof to the processing circuitry 170 (which could be part of the processing circuitry 188). Thus, the band edge power reduction system can prevent the overload of the A/D converter 182 caused by signals from wireless units or RF signal sources operating in adjacent frequency bands and/or not under the power control of the receiver 120.

In alternative embodiments, the processing circuitry 170 can provide control signal(s) to control the variable filter 180 as a function of the amplitude of signals not under the control of the receiver 120, for example by comparing the amplitude of signals under the control of the receiver 120 and the total amplitude of signals within the frequency band of operation. Alternatively, the amplitude of signals not under the control of the of the receiver 120 can be assumed and cause a change in the filtering characteristics of the receiver 120 if the processing circuitry 170 receives an indication of overload or saturation, for example by receiving an overload signal from the A/D 182. Furthermore, alternative embodiments for the variable filter 180 are possible for which the filtering characteristics can change using control signals from the processing circuitry 170.

In addition to the embodiment described above, alternative configurations of the band edge amplitude reduction system according to the principles of the present invention are possible which omit and/or add components and/or use variations or portions of the described receiver architecture. As would be understood by one of ordinary skill in the art, the various components making up the receiver architecture and their respective operating parameters and characteristics should be properly matched up to provide the proper operation. For example, an embodiment of the receiver system can be used to receive signals from a North American TDMA system, a Global System For Mobile Communication (GSM) system, a code division multiple access (CDMA) system or frequency division multiple access (FDMA) systems. Accordingly, the receiver according to the principles of the present invention can receive analog signals using different frequency bands or schemes. The analog signals can be characterized as wideband, broadband and/or narrowband. Additionally, the embodiments of the receiver according to the principles of the present invention have been described with frequency band(s) associated with base station receive frequencies, but the receiver architecture according to the principles of the present invention can be used in wireless units, such as mobile units, receiving information from other frequency band(s), such as a wireless unit receive band.

Furthermore, the receiver system has been described using a particular configuration of distinct components, but it should be understood that the receiver system and portions thereof can be implemented in application specific integrated circuits, software-driven processing circuitry, firmware, programmable logic devices, hardware or other arrangements of discrete components as would be understood by one of ordinary skill in the art with the benefit of this disclosure. Although in the illustrative embodiment is shown with a particular circuitry, the band edge amplitude reduction system can use different components which together perform similar functions when compared to the circuitry shown. What has been described is merely illustrative of the application of the principles of the present invention. Those skilled in the art will readily recognize that these and various other modifications, arrangements and methods can be made to the present invention without strictly following the exemplary applications illustrated and described herein and without departing from the spirit and scope of the present invention.

The invention claimed is:

1. A method of using at least one filter to receive signals from an antenna by changing filtering characteristics, said method comprising:

changing filtering characteristics on a main signal path as a function of at least one amplitude on another signal path (18) coupled to the main signal path and a power level on the main signal path where the main signal path and the other signal path have a frequency band of operation and where said amplitude is an adjacent band relative to the frequency band of operation;

receiving analog signals on said main signal path;

producing a replica of said analog signals on the other signal path where the other signal path is a band edge detection path;

dividing said analog signals on said band edge detection path onto an upper edge detection path and a lower edge detection path;

producing an upper edge amplitude for said analog signals at an upper edge relative to said frequency band of operation on said upper edge detection path and a lower edge amplitude for said analog signals at a lower edge relative to said frequency band of operation on said lower edge detection path; and detecting a power level of the signal on the main signal path.

2. A band edge amplitude reduction system for a receiver comprising:

a variable filter on a main signal path having a frequency band of operation;

processing circuitry for changing filtering characteristics of said variable filter as a function of at least one amplitude for a frequency band adjacent to the frequency band of operation or as a function of signals not under the control of said, receiver and as a function of at least one amplitude for the frequency band of operation;

a band edge detection path for receiving a replica of analog signals on said main signal path;

a signal divider for dividing said analog signals on said band edge detection path onto an upper edge detection path and a lower edge detection path; and detection circuitry for receiving said signals on said upper edge detection path and said lower edge detection path and produces to said processing circuitry an upper edge amplitude for said analog signals at an upper edge relative to said frequency band of operation and a lower edge amplitude for said analog signals at a lower edge relative to said frequency band of operation.

3. A method of reducing interference in a wireless communication system, the method comprising:

receiving radio frequency analog signals in an operating frequency band on a main signal path of a receiver;

filtering the received analog signals via a variable filter;

sending the filtered analog signals to an analog power level indicator;

determining the power level of the operating frequency band via the analog power level indicator;

sending a replica of the received radio frequency analog signals in the operating frequency band to band edge detection circuitry;

splitting the replica of the received radio frequency analog signals and providing a replica on each of an upper band edge detection path and a lower band edge detection path;

measuring at least one amplitude for an adjacent frequency band, where the adjacent frequency band is not under the control of the receiver;

comparing the amplitude for the adjacent frequency band to the power level of the operating frequency band; and adjusting the variable filter as a function of the comparison made between the amplitude for the adjacent frequency band to the power level of the operating frequency band.

4. A method of reducing interference in a wireless communication system, the method comprising:

receiving radio frequency analog signals in an operating frequency band on a main signal path of a receiver;

filtering the received analog signals via a variable filter;

sending the filtered analog signals to an analog to digital converter;

sending the output of the analog to digital converter to a digital power level indicator;

determining the power level of the operating frequency band via digital power level indicator;

sending a replica of the received radio frequency analog signals in the operating frequency band to band edge detection circuitry;

splitting the replica of the received radio frequency analog signals and providing a replica on each of an upper band edge detection path and a lower band edge detection path;

measuring at least one amplitude for an adjacent frequency band, where the adjacent frequency band is not under the control of the receiver;

comparing the amplitude for the adjacent frequency band to the power level of the operating frequency band; and adjusting the variable filter as a function of the comparison made between the amplitude for the adjacent frequency band to the power level of the operating frequency band.

\* \* \* \* \*